US008760675B2

(12) United States Patent
Ozaki

(10) Patent No.: US 8,760,675 B2
(45) Date of Patent: Jun. 24, 2014

(54) IMAGE READING APPARATUS AND IMAGE READING SYSTEM HAVING A READING PREFERENCE INPUT OPERATION

(75) Inventor: Kazumasa Ozaki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 29 days.

(21) Appl. No.: 13/591,608

(22) Filed: Aug. 22, 2012

(65) Prior Publication Data
US 2013/0077115 A1 Mar. 28, 2013

(30) Foreign Application Priority Data

Sep. 28, 2011 (JP) ................................. 2011-212074

(51) Int. Cl.
G06F 15/00 (2006.01)
G06F 3/12 (2006.01)
G06K 1/00 (2006.01)
H04N 1/00 (2006.01)
G06K 15/00 (2006.01)

(52) U.S. Cl.
CPC ............... H04N 1/00 (2013.01); H04N 1/0084 (2013.01); G06K 15/00 (2013.01)
USPC ......................................... 358/1.13; 358/1.15

(58) Field of Classification Search
CPC ........ H04N 1/00; H04N 1/0084; G06K 15/00
USPC ......................................... 358/1.1, 1.13, 1.15
See application file for complete search history.

(56) References Cited

U.S. PATENT DOCUMENTS

2007/0211301 A1 9/2007 Hayashi
2008/0252918 A1 10/2008 Nagata
2010/0079791 A1 4/2010 Kim
2010/0208297 A1 8/2010 Takamiya (Continued)

FOREIGN PATENT DOCUMENTS

EP 1 511 287 A2 3/2005
JP 9-204515 8/1997

(Continued)

OTHER PUBLICATIONS

Extended European Search Report dated Nov. 28, 2012 from related Application No. 12180359.7.

(Continued)

Primary Examiner — Douglas Tran
(74) Attorney, Agent, or Firm — Scully, Scott, Murphy & Presser, PC

(57) ABSTRACT

An image reading apparatus includes: an input operation unit; a reading device which performs a scanning operation of reading an image of a document; and a control unit. The control unit performs: a communication receiving process of receiving a scan condition for the scanning operation through a data communication unit; an input receiving process of receiving a scan condition for the scanning operation through the input operation unit; a selection receiving process of receiving a selection instruction received by the input operation unit and representing whether to perform a first reading mode for performing the scanning operation preferentially on a basis of the scan condition received in the communication receiving process or a second reading mode for performing the scanning operation preferentially on a basis of the scan condition received in the input receiving process; and a scanning executing process of performing the selected reading mode.

13 Claims, 7 Drawing Sheets

(56) References Cited

U.S. PATENT DOCUMENTS

2011/0090543 A1     4/2011   Hashiguchi et al.
2011/0176171 A1*   7/2011   Hagiuda ..................... 358/1.15
2013/0088760 A1*   4/2013   Fujita et al. .................. 358/474

FOREIGN PATENT DOCUMENTS

| JP | 9-284448 | 10/1997 |
| JP | 2000-29592 | 1/2000 |
| JP | 2004-172905 A | 6/2004 |
| JP | 2007-243743 A | 9/2007 |
| JP | 2007-312166 A | 11/2007 |
| JP | 2008-263321 A | 10/2008 |
| JP | 2009-261033 A | 11/2009 |
| JP | 2010-187089 A | 8/2010 |

OTHER PUBLICATIONS

Notification of Reasons for Refusal dated Sep. 10, 2013 from related Japanese Application No. 2011-212074, together with an English language translation.

European Official Action dated Apr. 23, 2014 from related application 12 180 359.7.

* cited by examiner

FIG. 6

INPUT SCAN CONDITION

| OPTION ITEM | OPTION VALUE |
|---|---|
| RESOLUTION | 300dpi |
| COLOR | COLOR |
| FILE FORMAT | PDF |
| DOCUMENT SIZE | A4 |
| SLANT CORRECTION | ON |
| BLANK REMOVAL | OFF |
| BACKGROUND COLOR REMOVAL | ON |

+

REGISTERED SCAN CONDITION

| OPTION ITEM | OPTION VALUE |
|---|---|
| RESOLUTION | 600dpi |
| COLOR | MONOCHROME |
| FILE FORMAT | JPEG |
| DOCUMENT SIZE | LETTER |
| SLANT CORRECTION | ON |
| BLANK REMOVAL | ON |
| BACKGROUND COLOR REMOVAL | OFF |
| CONTRAST | 0 |
| BRIGHTNESS | 0 |
| AutoCrop | ON |
| FILE NAME | scan_data |
| STORAGE DESTINATION | C:¥xxx¥yyy |

⇒

SCAN CONDITION FOR EXECUTION

| OPTION ITEM | OPTION VALUE |
|---|---|
| RESOLUTION | 300dpi |
| COLOR | COLOR |
| FILE FORMAT | PDF |
| DOCUMENT SIZE | A4 |
| SLANT CORRECTION | ON |
| BLANK REMOVAL | OFF |
| BACKGROUND COLOR REMOVAL | ON |
| CONTRAST | 0 |
| BRIGHTNESS | 0 |
| AutoCrop | OFF |
| FILE NAME | scan_data |
| STORAGE DESTINATION | C:¥xxx¥yyy |

← INPUT SCAN CONDITION (upper rows) ← SOME OPTION ITEMS OF REGISTERED SCAN CONDITION (lower rows)

IMAGE READING APPARATUS AND IMAGE READING SYSTEM HAVING A READING PREFERENCE INPUT OPERATION

This application claims priority from Japanese Patent Application No. 2011-212074 filed on Sep. 28, 2011, the entire subject-matter of which is incorporated herein by reference.

TECHNICAL FIELD

The present invention relates to a technology for setting a scan condition for a scanning operation of an image reading apparatus.

BACKGROUND

There have been proposed a related-art technology of registering a plurality of scan condition files in a network scanner capable of communication with a plurality of hosts through a network, and allowing any one of the plurality of scan condition files to be selected according to an instruction from an operation unit of the network scanner or a host.

SUMMARY

In some cases, it is desired to use an image reading apparatus capable of performing communication with an external apparatus such as a host or an external memory to use a scan condition registered in the external apparatus. However, according to the above-described related-art technology, always, only the scan condition registered on the image reading apparatus side is available. Thus, the convenience of the image reading apparatus may be low.

Illustrative aspects of the present invention provide a technology capable of improving convenience as compared to the technology according to the related art in which only the scan condition registered on the image reading apparatus is available.

According to one illustrative aspect of the present invention, there is provided an image reading apparatus comprising: a data communication unit configured to perform data communication with an external apparatus; an input operation unit configured to receive user's input operation; a reading device configured to perform a scanning operation of reading an image of a document; and a control unit. The control unit is configured to perform: a communication receiving process of receiving a scan condition for the scanning operation through the data communication unit; an input receiving process of receiving a scan condition for the scanning operation through the input operation unit; a selection receiving process of receiving a selection instruction received by the input operation unit and representing whether to perform a first reading mode or a second reading mode, wherein the first reading mode is for making the reading device perform the scanning operation preferentially on a basis of the scan condition received in the communication receiving process, and wherein the second reading mode is for making the reading device perform the scanning operation preferentially on a basis of the scan condition received in the input receiving process; and a scanning executing process of performing the reading mode selected by the selection instruction received in the selection receiving process.

Illustrative aspects of the present invention can be implemented in various forms such as an image reading method, a program (e.g., an image reading program) for implementing the corresponding method or the functions of the above-described image reading apparatus, a computer-readable storage medium having the image reading program stored thereon, and the like.

According to the present invention, the user can use the input operation unit of the image reading apparatus to select whether to make the reading device perform the scanning operation preferentially on the basis of the scan condition received from the external apparatus or make the reading device perform the scanning operation preferentially on the basis of the scan condition received by the input operation unit. Therefore, it is possible to improve convenience in reading images, as compared to the related art in which only the scan condition registered on the image reading apparatus side is usable.

BRIEF DESCRIPTION OF THE DRAWINGS

FIG. 6 is a view illustrating a relation among a registered scan condition, an input scan condition, and a scan condition for execution.

DETAILED DESCRIPTION

Exemplary Embodiments

Exemplary embodiments of the present invention will now be described with reference to the Drawings.

An image reading system 1 according to an exemplary embodiment will be described with reference to FIGS. 1 to 2.

1. Electrical Configuration of Image Reading System

Figure 1:
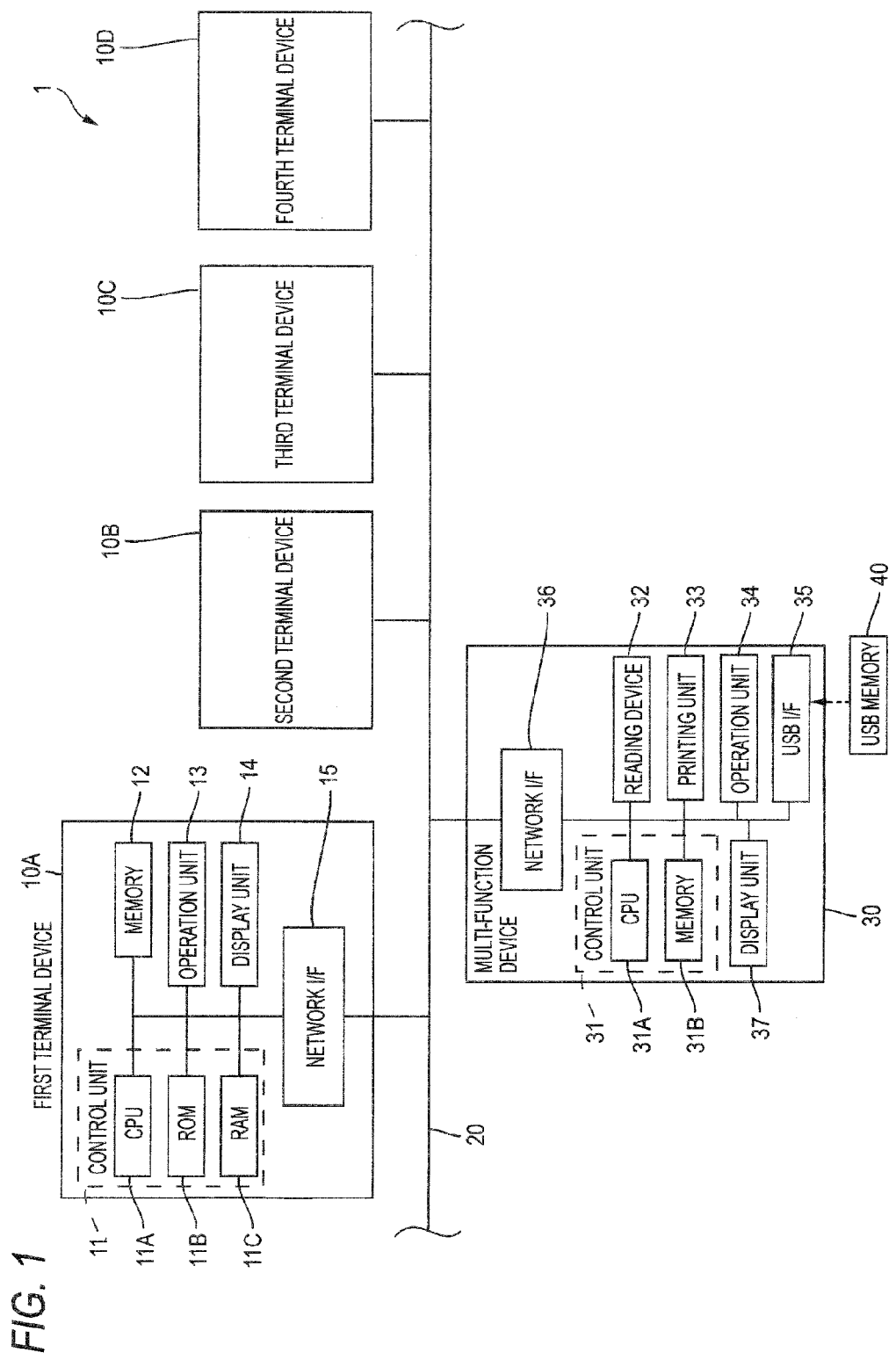
FIG. 1 is a block diagram illustrating an electrical configuration of an image reading system according to an exemplary embodiment of the present invention.

As shown in FIG. 1, the image reading system 1 includes a plurality of terminal devices 10 and a multi-function device 30. FIG. 1 illustrates four terminal devices 10 (a first terminal device 10A, a second terminal device 10B, a third terminal device 10C, and a fourth terminal device 10D), which have a common basic configuration. For this reason, an internal configuration of only the first terminal device 10A is shown, and the internal configurations of the second terminal device 10B, the third terminal device 10C, and the fourth terminal device 10D are omitted. Incidentally, the terminal devices 10 are examples of an external apparatus, and the multi-function device 30 is one example of an image reading apparatus.

1-1. Terminal Device

The first terminal device 10A may include, for example, a personal computer or a server computer. The first terminal device 10A includes a control unit 11, a memory 12, an operation unit 13, a display unit 14, a network interface 15, and the like. The control unit 11 includes a CPU 11A, a ROM 11B, and a RAM 11C. The memory 12 is a non-volatile memory such as a hard disk drive (HDD). The operation unit 13 includes a keyboard, a pointing device, and the like. The display unit 14 includes a liquid crystal display and the like. The network interface 15 is connected with the second to fourth terminal devices 10B to 10D and the multi-function device 30 through a communication line 20 in a wired or wireless way such that communication is possible.

In the ROM 11B or the memory 12, there are stored an OS, applications capable of processing read data from the multi-function device 30, applications capable of generating image data for print, a printer driver for controlling the multi-function device 30, and various programs such as a scan management program for performing a scan management process to be described below. In accordance with a program read from the ROM 11B or the memory 12, the control unit 11 controls the operation of the first terminal device 10A while storing process results in the RAM 11C.

1-2. Multi-Function Device

The multi-function device 30 can perform a plurality of functions, such as a scanner function, a copy function, and a print function, to form images. The multi-function device 30 includes a control unit 31, a reading device 32, a printing device 33, an operation unit 34, a universal serial bus (USB) interface 35, a network interface 36, a display unit 37, and the like. The control unit 31 includes a CPU 31A and a memory 31B. The memory 31B may include, for example, a ROM, a RAM, a NVRAM, a flash ROM, and the like.

In the memory 31B, there are recorded various programs for controlling the operation of the multi-function device 30, and an image reading program to be described below. The control unit 31 controls the operation of the multi-function device 30 according to a program read from the memory 31B. The reading device 32 includes, for example, a contact image sensor (CIS) or a charge-coupled drive image sensor (CCD). The reading device 32 can perform a scanning operation of reading images of documents set on a platen (not shown) and outputting read data according to the read image.

The printing device 33 prints images based on the read data from the reading device 32 or print data received from the terminal devices 10 onto sheets such as paper sheets or OHP sheets in an electrographic way or an inkjet way, for example. The operation unit 34 includes a plurality of buttons and the like, and can receive various kinds of input operation of a user. The display unit 37 includes a display part such as a liquid crystal display. The operation unit 34 and the display unit 37 are examples of an input operation unit, and may be a touch panel type in which it is possible to perform input operation by touching the display part.

The USB interface 35 allows an external apparatus such as a USB memory 40 shown in FIG. 1 to be detachably connected thereto. The control unit 31 can access information stored in the USB memory 40 that is connected to the USB interface 35. The network interface 36 is connected to the terminal devices 10 and the like through the communication line 20 in a wired or wireless way such that the network interface 36 is capable of perform data communication with the terminal devices 10 and the like. The network interface 36 is one example of a data communication unit. The control unit 31 transmits data to the terminal devices 10 and the like, or receives data from the terminal devices 10 and the like, through the network interface 36.

2. Input Operation of User and Contents of Processes of Multi-Function Device and Terminal Device FIG. 2 sequentially shows a relation between input operation of the user and processes of the multi-function device 30 and the first terminal device 10A. For example, in STEP U1 shown in FIG. 2, when the user sets a document on the platen of the reading device 32 and performs input operation on the operation unit 34 to request performance of scanning, specifically, when the user pushes a scan key to select the scanner function from the plurality of functions of the multi-function device 30, the control unit 31 of the multi-function device 30 performs a scanning process shown in FIG. 3. In this case, the control unit 31 can select and perform any one of: a first reading mode to make the reading device 32 perform a scanning operation preferentially on the basis of a scan condition received from the first terminal device 10A; or a second reading mode to make the reading device 32 perform a scanning operation preferentially on the basis of a scan condition received by the operation unit 34.

2-1. Scanning Process

Specifically, the CPU 31A reads the image reading program from the memory 31B, and performs a scanning process. FIG. 4 shows examples of transitions of screens displayed on the display part of the display unit 37 of the multi-function device 30 during the scanning process. First, in STEP S1 shown in FIGS. 2 and 3, the CPU 31A makes the display part of the display unit 37 display a function selection screen G1 (see FIG. 4). The scanner function may include various functions different from each other in their detailed processes, for example, 'Scan to File', 'Scan to E-mail', 'Scan to OCR', and 'Scan to Image' as shown in FIG. 4, and the contents of these functions will be described as follows.

The function 'Scan to File' is a function in which the multi-function device 30 transmits read data output from the reading device 32 to the terminal device 10, and the terminal device 10 stores the read data in the memory 12 or the like.

The function 'Scan to E-mail' is a function in which the multi-function device 30 transmits read data output from the reading device 32 to the terminal device 10, and the terminal device 10 attaches the read data to a mail displayed on the display unit 14.

The function 'Scan to OCR' ("OCR" is an abbreviation for "Optical Character Recognition") is a function in which the multi-function device 30 transmits read data output from the reading device 32 to the terminal device 10, and the terminal device 10 recognizes characters on a read image on the basis of the read data and converts the recognized characters into text data.

The function 'Scan to Image' is a function in which the multi-function device 30 transmits read data output from the reading device 32 to the terminal device 10, and the terminal device 10 makes the display unit 14 display a read image based on the read data.

Figure 2:
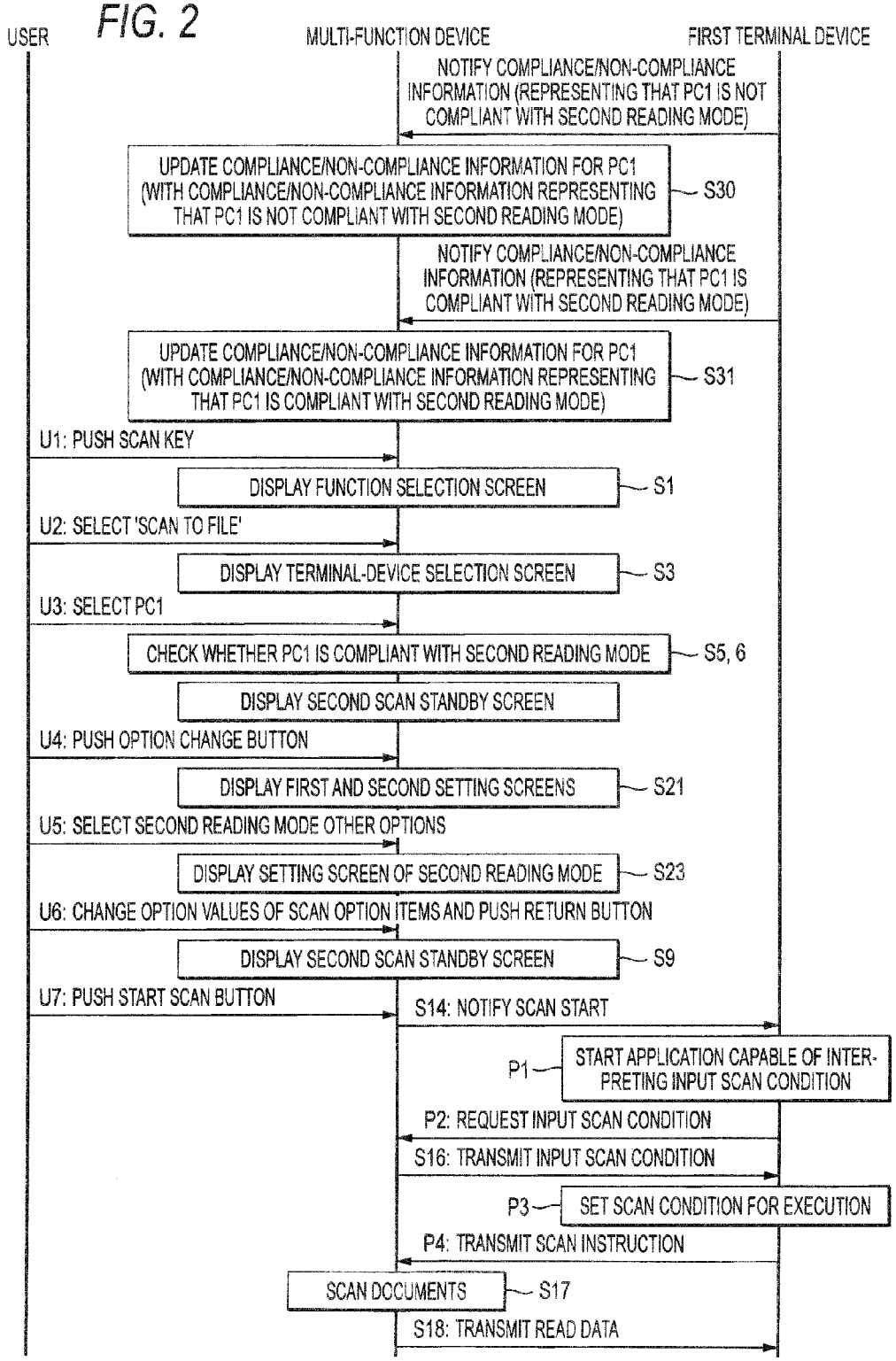
FIG. 2 is a view illustrating a relation between user's input operation and processes of a multi-function device and a terminal device.
Figure 3:
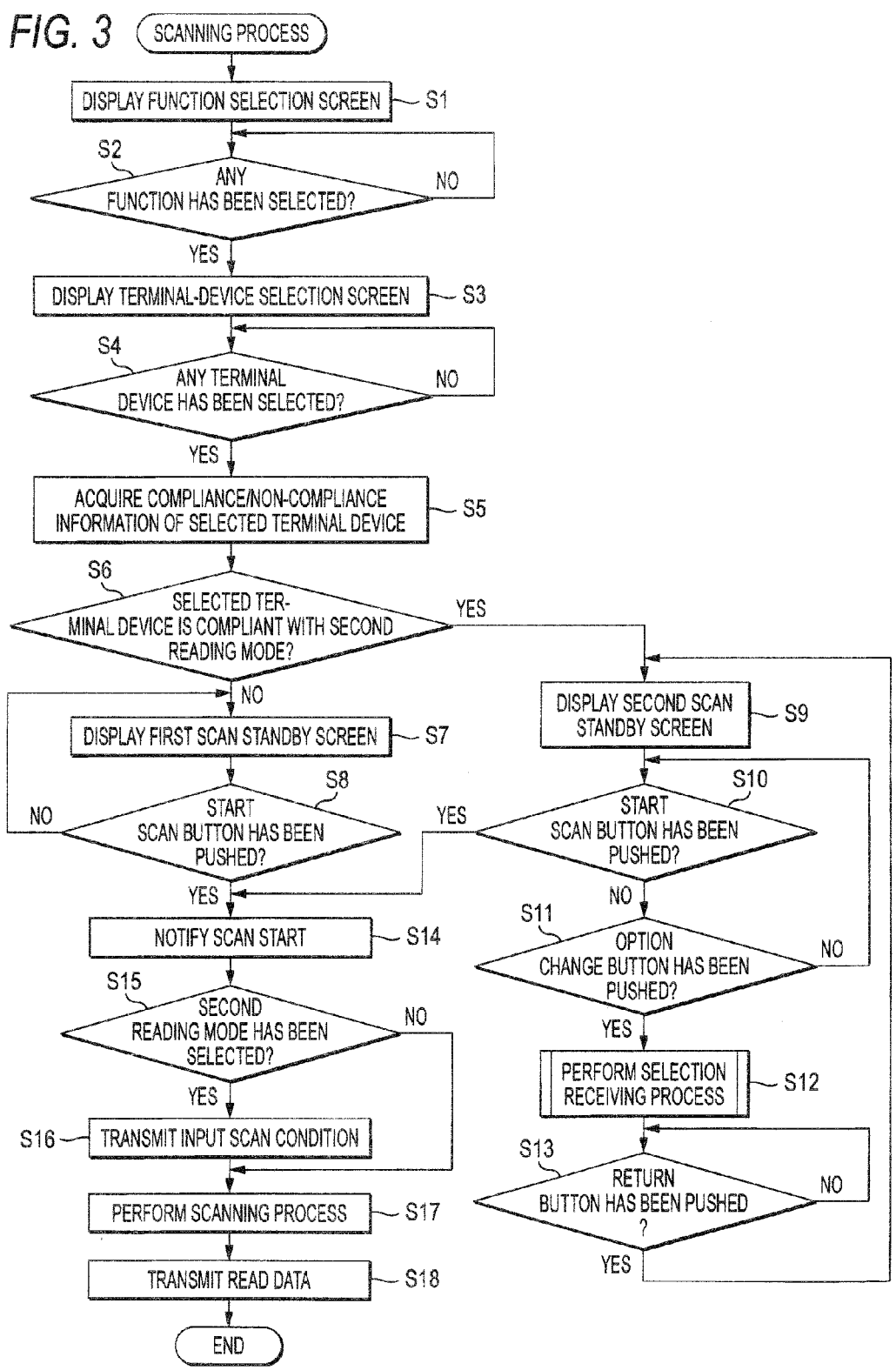
FIG. 3 is a flow chart illustrating a scanning process.
Figure 4:
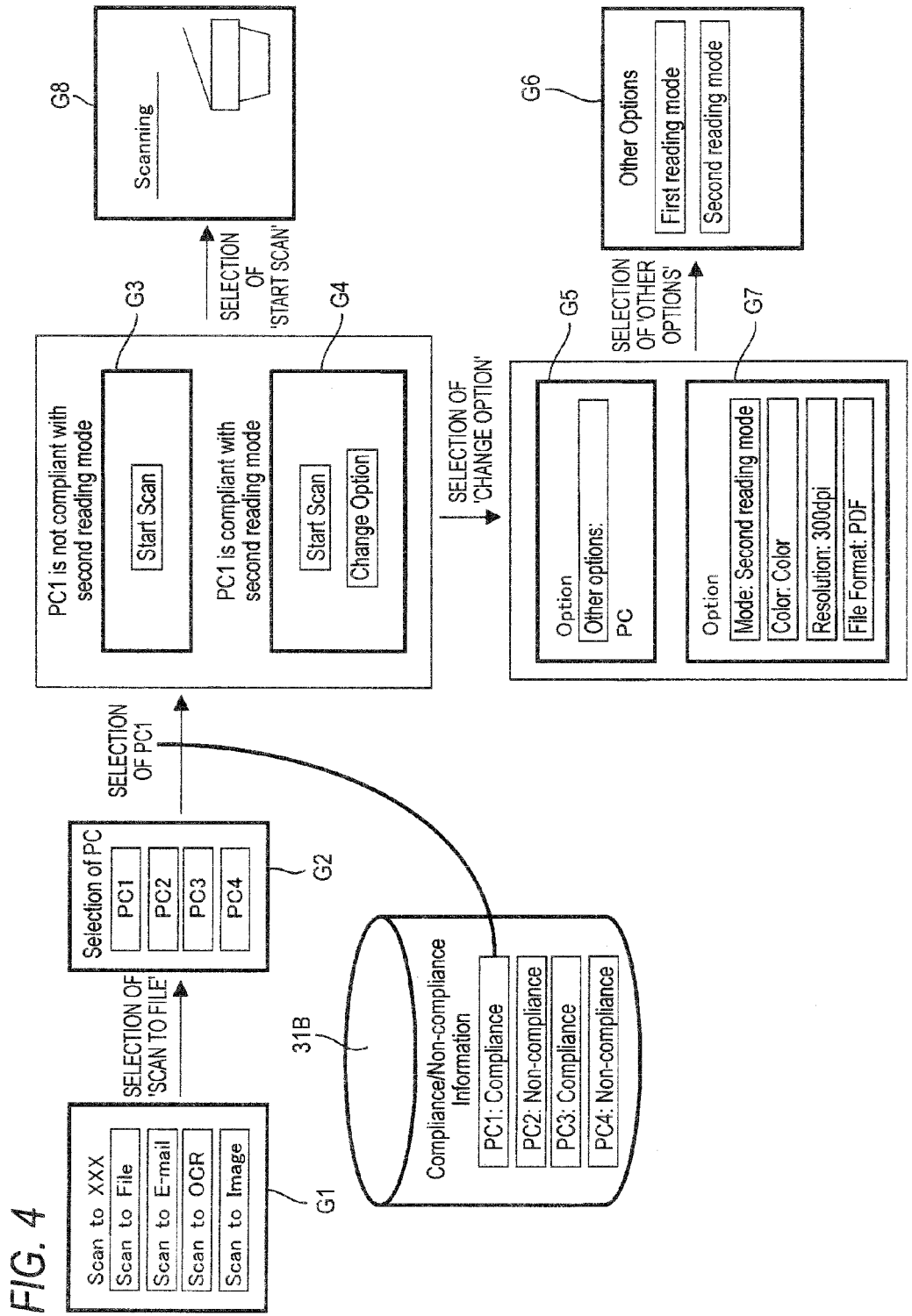
FIG. 4 is a schematic view illustrating transitions of display screens on a display part.

Next, when confirming that the operation unit 34 has received a function selection instruction to select any one of the above-described functions on the function selection screen G1 (YES in STEP S2), the CPU 31A makes the display part display a terminal-device selection screen G2 (see FIG. 4) in STEP S3 shown in FIGS. 2 and 3. In the examples of FIGS. 2 and 4, the user selects the function 'Scan to File' in STEP U2. On the terminal-device selection screen G2, identification information items PC1 to PC4 of the four terminal devices 10 are displayed as choices.

Next, when confirming that the operation unit 34 has received a terminal-device selection instruction to select any one of the four terminal devices 10 on the terminal-device selection screen G2 (Yes in STEP S4), in STEP S5, the CPU 31A acquires compliance/non-compliance information relative to the selected terminal device 10 from the memory 31B. The compliance/non-compliance information is information on whether each terminal device 10 is compliant with the second reading mode. With respect to each of the above-described functions, compliance/non-compliance information of each terminal device 10 is managed. Specifically, when receiving a scan condition input to the multi-function device 30, the terminal device 10 determines whether an application capable of interpreting the scan condition can be started. As for such application, an application 'Control Center' provided by the applicant of the present invention can be exemplified. The non-compliance with the second reading mode means, for example, that such application has not been installed in the terminal device 10, or such application has been installed in the terminal device 10 but is set to not start even if receiving the scan condition.

Further, as shown by STEPS S30 and S31 in FIG. 2, the CPU 31A of the multi-function device 30 receives compliance/non-compliance information notified, that is, transmitted from each terminal device 10, and performs an information updating process of updating the compliance/non-compliance information stored in the memory 31B, with the received compliance/non-compliance information. In this case, as compared to a configuration in which compliance/non-compliance information is unable be updated, the multi-function device 30 can grasp changes between compliance and non-compliance information of each terminal device 10 with the second reading mode in real time and reflect the changes to a scanning process. Incidentally, in the present exemplary embodiment, when there is any change between the compliance and non-compliance of each terminal device 10 with the second reading mode, the corresponding terminal device 10 transmits changed compliance/non-compliance information to the multi-function device 30. Alternatively, the multi-function device 30 may ask each terminal device 10 for the compliance/non-compliance information and receive the compliance/non-compliance information, regularly or whenever necessary.

When acquiring the compliance/non-compliance information, in STEP S6, the CPU 31A performs a compliance determining process on the basis of the acquired compliance/non-compliance information. Specifically, the CPU 31A determines whether the terminal device 10 selected in STEP 84 is compliant with the second reading mode. In the examples of FIGS. 4 and 2, when the user selects the first terminal device 10A (having the identification information PC1) in STEP U3, the multi-function device 30 refers to the compliance/non-compliance information of the first terminal device 10A and determines whether the first terminal device 10A is compliant with the second reading mode in STEPS S5 and S6.

Then, the CPU 31A performs a performance determining process in which, when determining that the selected terminal device 10 is compliant with the second reading mode (YES in STEP S6), the CPU 31A allows performance of the second reading mode; whereas when determining that the selected terminal device 10 is not compliant with the second reading mode (NO in STEP S6), the CPU 31A prevents performance of the second reading mode. Therefore, it is possible to suppress the user from selecting the second reading mode although the terminal device 10 is not compliant with the second reading mode.

Specifically, when determining that the selected first terminal device 10A is compliant with the second reading mode (YES in STEP S6), the CPU 31A makes the display part display a second scan standby screen G4 as shown in FIG. 4 in STEP S9 of FIGS. 2 and 3. On the second scan standby screen G4, a start scan button and an option change button are displayed. When receiving that the user has pushed the option change button through the operation unit 34 in STEP U4 (NO in STEP S10 and YES in STEP S11 in FIG. 3), in STEP S12 of FIG. 3, the CPU 31A performs a selection receiving process shown in FIG. 5.

2-2. Selection Receiving Process

In the selection receiving process, the CPU 31A receives a selection instruction representing whether to set the first reading mode or the second reading mode, through the operation unit 34. Specifically, in STEP S21 of FIGS. 2 and 5, the CPU 31A makes the display part display a first setting screen G5 shown in FIG. 4. On the first setting screen G5, a button for other options is displayed. When receiving through the operation unit 34 that the button for other options has been pushed by the user, in STEP S21 of FIGS. 2 and 5, the CPU 31A makes the display part display a second setting screen G6 shown in FIG. 4. On the second setting screen G6, a first-read-mode button and a second-read-mode button are displayed. Then, the user can push any one of the first-read-mode button and the second-read-mode button so as to select the first reading mode or the second reading mode.

When determining that the second reading mode has been selected on the basis of the selection instruction (STEP U5 of FIG. 2) (YES in STEP S22 of FIG. 5), the CPU 31A performs an input receiving process of receiving a scan condition for a scanning operation through the operation unit 34. Specifically, in STEP S23 of FIGS. 2 and 5, the CPU 31A makes the display part display a setting screen G7 of the second reading mode shown in FIG. 4. On the setting screen G7 of the second reading mode, option items of an input scan condition receivable in the input receiving process on the multi-function device 30 side are displayed.

As described above, in the present exemplary embodiment, after receiving a selection instruction to select the second reading mode, the CPU 31A makes the display part display option items of the input scan condition. Therefore, it is possible to suppress display of unnecessary images, as compared to a configuration in which option items of a second scan condition are displayed on the display part from before any selection instruction to select the second reading mode is received. Specifically, in the present exemplary embodiment, on the setting screen G7 of the second reading mode, only the option items of the second scan condition are displayed. Therefore, it is possible to suppress unacceptable scan conditions from being uselessly input in the input receiving process. The input scan condition is one example of a second scan condition.

On the setting screen G7 of the second reading mode shown in FIG. 4, as the option items of the input scan condition, for example, an option item relative to whether to make the reading device 32 generate read data in color or black and white, an option item relative to a resolution to be used to make the reading device 32 perform a scanning operation, and an option item relative to a file format for read data to be generated by the reading device 32 are displayed. In STEP U6 of FIG. 2, the user can perform input operation on the operation unit 34 to set or change a value of each of the option items of the input scan condition. Incidentally, it is preferable for the CPU 31A to be configured to perform the input receiving process on the basis of the input operation of the user, independently from the scanning process, register the input results in the memory 31B in advance, and display the registered values as default values for the option items of the input scan condition on the setting screen G7 of the second reading mode.

On the other hand, when determining that the first read mode has been selected (NO in STEP S22), in STEP S24, the display screen returns from the second setting screen G6 to the first setting screen G5. On the first setting screen G5, the items of the input scan condition are not displayed. Therefore, it is possible to suppress input scan conditions from being uselessly input by the user.

In a state in which the first setting screen G5 or the setting screen G7 of the second reading mode is displayed by the selection receiving process, when the user pushes a return button (not shown) of the operation unit 34 in STEP U6 of FIG. 2 (YES in STEP S13 of FIG. 3), in STEP S9 of FIGS. 2 and 3, the display screen returns to the second scan standby screen G4. Thereafter, when receiving through the operation unit 34 that the start scan button has been pushed in STEP U7 by the user (YES in STEP S10 of FIG. 3), the CPU 31A proceeds to STEP S14.

When determining in STEP S6 of FIG. 3 that the selected terminal device 10 is not compliant with the second reading mode (NO in STEP S6), in STEP S7, the CPU 31A makes the display part display a first scan standby screen G3 shown in FIG. 4. On the first scan standby screen G3, choices of both of the first reading mode and the second reading mode are not displayed. As described above, when it is determined that the selected terminal device 10 is not compliant with the second reading mode, the display part does not display a screen for selecting any one of the first reading mode and the second reading mode. Therefore, it is possible to suppress the second reading mode from being selected even though the selected terminal device 10 is not compliant with the second reading mode. When receiving that the user has pushed the start scan button on the first scan standby screen G3 through the operation unit 34 (YES in STEP S8 of FIG. 3), the CPU 31A proceeds to STEP S14.

2-3. Scanning Executing Process

When it is determined whether to perform the first reading mode or the second reading mode in the selection receiving process, the CPU 31A performs a scanning executing process of performing the selected read mode. Specifically, in STEP S14 of FIGS. 2 and 3, the CPU 31A notifies scan start to the terminal device 10 selected on the terminal-device selection screen G2. This scan start notification includes the read-mode selection result of the selection receiving process. When receiving the scan start notification, the CPU 11A of the terminal device 10 starts the application capable of interpreting the above-described input scan condition in STEP P1 of FIG. 2. When the selection result represents that the second reading mode has been selected, in STEP P2, the CPU 11A requests the multi-function device 30 to transmit the input scan condition.

In a case where the second reading mode has been selected in the selection receiving process (YES in STEP S15), in STEP S16 of FIGS. 2 and 3, the CPU 31A of the multi-function device 30 performs a scan-condition transmitting process of transmitting option information on the input scan condition to the terminal device 10 in response to the input-scan-condition transmission request of the terminal device 10. When receiving the option information on the input scan condition, in STEP P3, the CPU 11A of the terminal device 10 sets a final scan condition for execution including the input scan condition and some option items of the registered scan condition registered in the memory 12 or the like in advance. The some option items of the registered scan condition are examples of a first scan condition.

FIG. 6 illustrates a registered scan condition, an input scan condition, a scan condition for execution set on the basis of them, various option items for generating read data in the scan condition for execution, and option values of the various option items. In the case where the second reading mode has been selected in the multi-function device 30, the CPU 11A sets a combination of the input scan condition and option items of the registered scan condition which do not overlap with those of the input scan condition, as the scan condition for execution, as shown in FIG. 6. In other words, since the option items from the option item 'RESOLUTION' at the top of the scan condition for execution to the option item 'BACK-GROUND COLOR REMOVAL' shown in FIG. 6 overlap between the input scan condition and the registered scan condition, the option information on the input scan condition is preferentially set. In a case where an option item of the registered scan condition is not compatible with the input scan condition, some of the option values of the option items of the registered scan condition may be changed to an option value compatible with the input scan condition.

For example, a mode 'AutoCrop' is to read a plurality of documents placed on the platen by moving the reading device 32 in a sub scanning direction and extract read data of each of the documents as separate read data. In FIG. 6, the option item 'AutoCrop' of the registered scan condition is set to 'ON'. When the 'AutoCrop' mode is ON, a scanning process is performed in the largest read range in consideration of a possibility that there is a plurality of documents randomly placed on the platen. On the other hand, in the input scan condition, the option item 'AutoCrop' does not exist, and the option item 'DOCUMENT SIZE' is set to A4. Therefore, the option value of the option item 'DOCUMENT SIZE' of the input scan condition is not compatible with the option item 'AutoCrop' which is ON in the registered scan condition. For this reason, in the scan condition for execution, the option item 'AutoCrop' is set to 'OFF'. In this way, it is possible to suppress the contents of the input scan condition from being changed for performing the second reading mode in a case where any option item of the registered scan condition is not compatible with the input scan condition.

After setting the scan condition for execution in STEP P3 of FIG. 2, the CPU 11A of the terminal device 10 transmits a scan instruction including the scan condition for execution to the multi-function device 30 in STEP P4 of FIG. 2. Meanwhile, the CPU 31A of the multi-function device 30 performs a scan-instruction receiving process of receiving the scan instruction (see FIG. 2). Next, in STEP S17 of FIGS. 2 and 3, the CPU 31A performs the second reading mode according to the scan condition for execution included in the scan instruction while making the display part display a scanning screen G8 (see FIG. 4). Subsequently, the CPU 31A transmits read data to the terminal device 10 in STEP S18 of FIGS. 2 and 3 and finishes the present scanning process. In the scan-instruction receiving process, the process of receiving the scan condition for execution is one example of a communication receiving process.

As described above, in the case where the second reading mode has been selected, the multi-function device 30 transmits the input scan condition to the terminal device 10 and receives the scan instruction including the input scan condition and some option items of the registered scan condition which are not receivable in the input receiving process. Therefore, the multi-function device 30 can assign the terminal device 10 the process of merging the registered scan condition and the input scan condition or processing them such that the option items of the registered scan condition are compatible with the input scan condition, and thus the process load on the multi-function device 30 can be reduced.

On the other hand, when the selection result included in the scan start notification represents that the first reading mode has been selected, the CPU 11A of the selected terminal device 10 transmits a scan instruction, including the registered scan condition set as the scan condition for execution, to the multi-function device 30, without requesting the multi-function device 30 to transmit the input scan condition. In other words, in the case where the first reading mode has been selected in the selection receiving process (NO in STEP S15), the CPU 31A of the multi-function device 30 does not transmit the input scan condition.

Next, the CPU 31A performs the communication receiving process of receiving the scan condition from the terminal device 10 so as to receive the registered scan condition included in the scan instruction. Subsequently, in STEP S17 of FIG. 3, the CPU 31A performs the first reading mode according to the registered scan condition while making the display unit display the scanning screen G8. Next, the CPU 31A transmits the read data to the terminal device 10 in STEP S18 of FIG. 3 and finishes the present scanning process. Incidentally, even in the registered scan condition, the option value of the option item 'DOCUMENT SIZE' and the option value 'ON' of the option item 'AutoCrop' may be not compatible with each other. For example, in a case where the first reading mode is selected in the selection receiving process and the registered scan condition is set as the scan condition for execution, when the registered scan condition is as shown in FIG. 6, since the option item 'AutoCrop' is ON, the option value of the option item 'DOCUMENT SIZE' may be invalidated, even though the option item 'DOCUMENT SIZE' for determining the read range is set to a letter size.

As described above, after the selection instruction is received in the selection receiving process, the communication receiving process is performed. In other words, the communication receiving process is performed after whether to use the registered scan condition is determined in the selection receiving process. Therefore, it is possible to suppress the communication receiving process from being uselessly performed, as compared to a configuration in which the communication receiving process is performed before the selection instruction is received in the selection receiving process.

According to the present exemplary embodiment, the user can use the operation unit 34 of the multi-function device 30 to select whether to perform the first reading mode or the second reading mode. Therefore, it is possible to improve convenience in reading images, as compared to the related art in which only the scan condition registered on the multi-function device 30 side is usable.

Further, it is possible to perform the second reading mode on the basis of not only the input scan condition receivable in the input receiving process but also some option items of the registered scan condition receivable only on the terminal device side.

Modification to Exemplary Embodiments

While the present invention has been shown and described with reference to certain exemplary embodiments thereof, it will be understood by those skilled in the art that various changes in form and details may be made therein without departing from the scope of the invention as defined by the appended claims.

In the above-described exemplary embodiments, the terminal devices 10 have been exemplified as the external apparatus. However, the external apparatus is not limited thereto. For example, the external apparatus may be an external memory such as the USB memory 40 shown in FIG. 1. Specifically, a scan condition may be stored in the USB memory 40 in advance, and the control unit 31 may receives the scan condition stored in the USB memory 40, in the communication receiving process or the like. In this case, the USB interface 35 is one example of the data communication unit.

In the above-described exemplary embodiments, the multi-function device 30 has been exemplified as the image reading apparatus. However, the image reading apparatus is not limited thereto. For example, the image reading apparatus may be a single scanner configured by removing at least the printing device 33 from the configuration of the multi-function device 30 of FIG. 3, a facsimile, or the like.

In the above-described exemplary embodiments, the multi-function device 30 receives a scan start instruction on the basis of user's input operation on the operation unit 34. However, the present invention is not limited thereto. The multi-function device 30 may be configured to receive a scan start instruction from the terminal device 10 based on user's input operation on the operation unit 13 of the terminal device 10.

In the above-described exemplary embodiments, in response to a scan start instruction, the multi-function device 30 transmits read data, output from the reading device 32, to the terminal device 10. However, the present invention is not limited thereto. For example, in response to a scan start instruction, the multi-function device 30 may store the read data in its own memory 31B or the USB memory 40, or display a read image based on the read data on an image display unit of the operation unit 34, or print the read image based on the read data on a sheet by the printing device 33, or perform other functions.

In the above-described exemplary embodiments, as an example of the compliance determining process, the control unit 31 determines whether the terminal device 10 is compliant with the second reading mode, on the basis of the compliance/non-compliance information stored on the multi-function device 30 side. However, the compliance determining process is not limited thereto. For example, as the compliance determining process, the terminal device 10 may determine whether the terminal device 10 is compliant with the second reading mode, according to whether compliance/non-compliance information representing that the terminal device 10 is compliant with the second reading mode has been stored on the multi-function device 30 side, or the control unit 31 may ask the terminal device 10 about whether the terminal device 10 is compliant with the second reading mode, without storing compliance/non-compliance information on the multi-function device 30 side.

Figure 5:
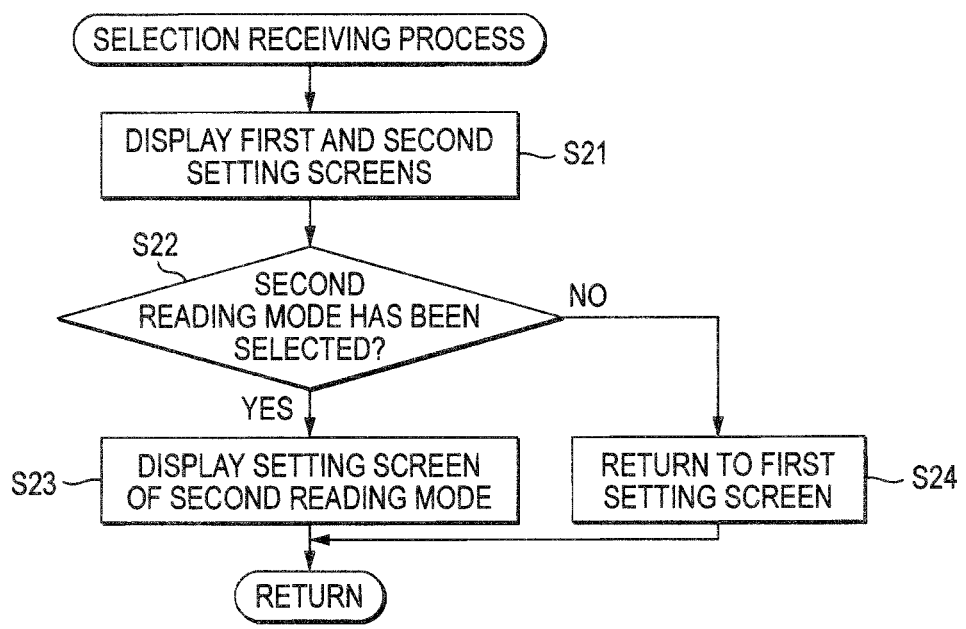
FIG. 5 is a flow chart illustrating a selection receiving process.
Figure 7:
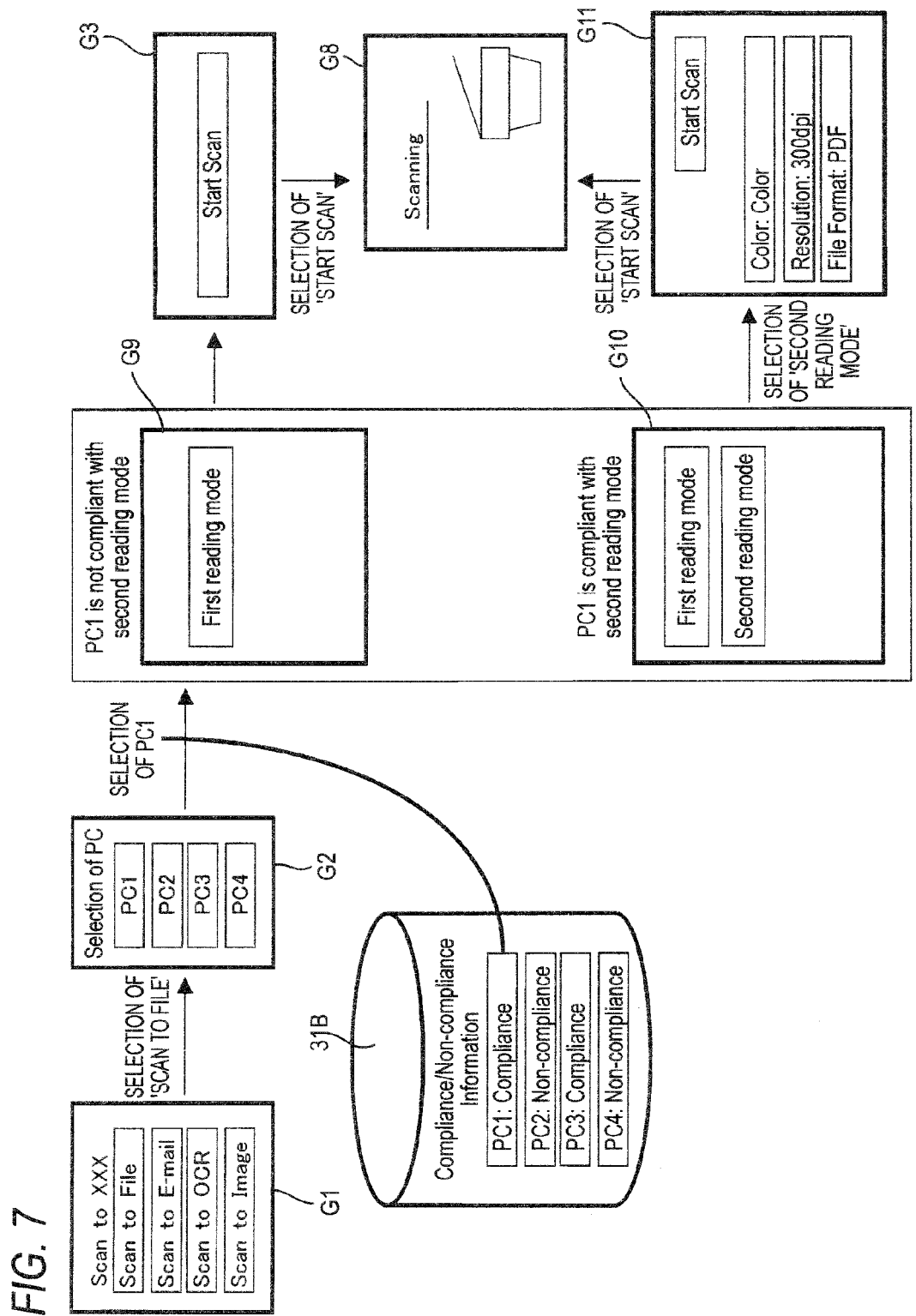
FIG. 7 is a schematic view illustrating transitions of display screens on a display unit according to a modification.

In the above-described exemplary embodiments, in the input receiving process, only the second scan condition is displayed (see STEP S23 of FIG. 5, and the setting screen G7 of the second reading mode shown in FIG. 7). However, the present invention is not limited thereto. In the input receiving process, the first scan condition may also be displayed so that its option values are unchangeable. In this case, the user can check the option contents of the first scan condition in the stage of the input receiving process.

In the above-described exemplary embodiments, in the case where it is determined that the selected terminal device 10 is compliant with the second reading mode, the CPU 31A makes the display part not display a screen including choices for the first reading mode and the second reading mode, an as to prevent execution of the second reading mode. However, the present invention is not limited thereto. While the start scan button is displayed as a choice for the first reading mode, a choice for the second reading mode may not be displayed to prevent performance of the second reading mode. In this case, it is possible to suppress the second reading mode from being selected in a case where the terminal device 10 is not compliant with the second reading mode.

For example, preferably, as shown in FIG. 7, after the terminal device 10 is selected, a selection screen G9 including only a choice for the first reading mode may be displayed, and when the corresponding choice is pushed, the selection screen G9 may transition to the first scan standby screen G3. Incidentally, in FIG. 7, in a case where it is determined that the selected terminal device 10 is compliant with the second reading mode, screen display may be performed as follows. After the terminal device 10 is selected, a selection screen G10 including choices for the first reading mode and the second reading mode may be displayed. In this case, when the second reading mode is selected, a second scan standby screen G11 may be displayed. Then, when a start scan button on the second scan standby screen G11 is pushed, the scanning operation is performed.

Alternative to the above-described exemplary embodiments, in the case where it is determined that the selected terminal device 10 is not compliant with the second reading mode, the CPU 31A may make the display part display a choice for the second reading mode but gray out the choice to prevent performance of the second reading mode. Further, the CPU 31A may display the display part display a choice for the second reading mode, but notify an error while invalidating selection of the choice for the second reading mode to prevent performance of the second reading mode, even if the corresponding choice is selected.

In the above-described exemplary embodiments, the scan condition for execution is set on the terminal device 10 side. However, the present invention is not limited thereto. The CPU 31A of the multi-function device 30 may receive some or all of the option items of the registered scan condition from the terminal device 10, and set the scan condition for execution on the basis of the received scan condition and the input scan condition.

In the above-described exemplary embodiments, the terminal device 10 changes the first scan condition to contents compatible with the second scan condition, and the multi-function device 30 receives the scan instruction including the first scan condition compatible with the second scan condition, from the terminal device 10. However, the present invention is not limited thereto. On the multi-function device 30 side, when a first scan condition received from the terminal device 10 is not compatible with the second scan condition, the first scan condition may be changed to contents compatible with the second scan condition, and perform the second reading mode.

In the above-described exemplary embodiments, the control unit 31 includes one CPU. Alternatively, the control unit 31 may be configured to include a plurality of CPUs, or be composed of a hard circuit such as an application specific integrated circuit (ASIC) or the like, or be composed of a CPU and a hard circuit. In a case where the control unit 31 includes a plurality of CPUs and hard circuits, for example, some or all of various processes such as the information changing process, the compliance determining process, the performance determining process, the selection receiving process, the input receiving process, the scanning executing process, the scan-condition transmitting process, the scan-instruction receiving process, the communication receiving process, and the like may be assigned to and performed in the plurality of CPUs and the like.

In the above-described exemplary embodiments, the image reading program is stored in the memory 31B. However, the present invention is not limited thereto. The image reading program may be stored in anon-volatile memory such as a hard disk device or a flash memory (registered as a trademark), a storage medium such as a CD-R, or the like.

According to another illustrative aspect of the present invention, in the image reading apparatus, wherein in the scanning execution operation, the control unit is configured to transmit read data, obtained by the scanning operation, to the external apparatus through the data communication unit. Further, the control unit is configured to further perform: a compliance determining process of determining whether the external apparatus is compliant with the second reading mode or not; and a performance determining process including: allowing performance of the second reading mode when it is determined in the compliance determining process that the external apparatus is compliant with the second reading mode; and preventing performance of the second reading mode when it is determined that the external apparatus is not compliant with the second reading mode.

According to still another illustrative aspect of the present invention, in the image reading apparatus, wherein the input operation unit includes a display unit, and wherein in the performance determining process, when it is determined in the compliance determining process that the external apparatus is not compliant with the second reading mode, the control unit makes the display unit display a choice for the first reading mode but not display any choice for the second reading mode so as to prevent performance of the second reading mode.

According to still another illustrative aspect of the present invention, in the image reading apparatus, wherein the input operation unit includes a display unit, and wherein in the performance determining process, when it is determined in the compliance determining process that the external apparatus is not compliant with the second reading mode, the control unit makes the display unit not display any selection screen including choices for the first reading mode and for the second reading mode so as to prevent performance of the second reading mode.

According to still another illustrative aspect of the present invention, the image reading apparatus further includes: a memory configured to store compliance/non-compliance information on whether the external apparatus is compliant with the second reading mode or not, wherein when receiving compliance/non-compliance information from the external apparatus through the data communication unit, the control unit performs an information updating process of updating the compliance/non-compliance information stored in the memory with the received compliance/non-compliance information.

According to still another illustrative aspect of the present invention, in the image reading apparatus, wherein when the selection instruction received in the selection receiving process is for selecting the second reading mode, the control unit is configured to: receive a first scan condition, which is not receivable in the input receiving process, from the external apparatus through the data communication unit; and perform the second reading mode, on the basis of the first scan condition and a second scan condition receivable in the input receiving process, in the scanning process.

According to still another illustrative aspect of the present invention, in the image reading apparatus, wherein the input operation unit includes a display unit, and wherein the control unit makes the display unit display only the second scan condition in the input receiving process.

According to still another illustrative aspect of the present invention, in the image reading apparatus, wherein the control unit is configured to further perform: a scan-condition transmitting process of transmitting the second scan condition through the data communication unit when the selection instruction received in the selection receiving process is for selecting the second reading mode; and a scan-instruction receiving process of receiving a scan instruction including the first scan condition and the second scan condition from the external apparatus through the data communication unit, and wherein in the scanning executing process, the control unit performs the second reading mode on the basis of the scan instruction received in the read-instruction receiving process.

According to still another illustrative aspect of the present invention, in the image reading apparatus, wherein in the scan-instruction receiving process, the control unit receives the scan instruction including the first scan condition compatible with the second scan condition, from the external apparatus through the data communication unit.

According to still another illustrative aspect of the present invention, in the image reading apparatus, wherein after receiving the selection instruction in the selection receiving process, the control unit performs the communication receiving process.

According to still another illustrative aspect of the present invention, in the image reading apparatus, wherein the input operation unit includes a display unit, and wherein after receiving the selection instruction for selecting the second reading mode in the selection receiving process, the control unit makes the display unit display option items of a scan condition receivable in the input receiving process.

What is claimed is:

1. An image reading apparatus comprising:
   a data communication unit configured to perform data communication with an external apparatus;
   an input operation unit configured to receive user's input operation;
   a reading device configured to perform a scanning operation of reading an image of a document; and
   a control unit configured to perform:
      a communication receiving process of receiving a scan condition for the scanning operation through the data communication unit;
      an input receiving process of receiving a scan condition for the scanning operation through the input operation unit;
      a selection receiving process of receiving a selection instruction received by the input operation unit and representing whether to perform a first reading mode or a second reading mode, wherein the first reading mode is for making the reading device perform the scanning operation preferentially on a basis of the scan condition received in the communication receiving process, and wherein the second reading mode is for making the reading device perform the scanning operation preferentially on a basis of the scan condition received in the input receiving process; and
      a scanning executing process of performing the reading mode selected by the selection instruction received in the selection receiving process.

2. The image reading apparatus according to claim 1, wherein in the scanning execution operation, the control unit is configured to transmit read data, obtained by the scanning operation, to the external apparatus through the data communication unit, and
   wherein the control unit is configured to further perform:
      a compliance determining process of determining whether the external apparatus is compliant with the second reading mode or not; and
      a performance determining process comprising:
         allowing performance of the second reading mode when it is determined in the compliance determining process that the external apparatus is compliant with the second reading mode; and
         preventing performance of the second reading mode when it is determined that the external apparatus is not compliant with the second reading mode.

3. The image reading apparatus according to claim 2, wherein the input operation unit comprises a display unit, and
   wherein in the performance determining process, when it is determined in the compliance determining process that the external apparatus is not compliant with the second reading mode, the control unit makes the display unit display a choice for the first reading mode but not display any choice for the second reading mode so as to prevent performance of the second reading mode.

4. The image reading apparatus according to claim 2, wherein the input operation unit comprises a display unit, and
   wherein in the performance determining process, when it is determined in the compliance determining process that the external apparatus is not compliant with the second reading mode, the control unit makes the display unit not display any selection screen including choices for the first reading mode and for the second reading mode so as to prevent performance of the second reading mode.

5. The image reading apparatus according to claim 2, further comprising:
   a memory configured to store compliance/non-compliance information on whether the external apparatus is compliant with the second reading mode or not,
   wherein when receiving compliance/non-compliance information from the external apparatus through the data communication unit, the control unit performs an information updating process of updating the compliance/non-compliance information stored in the memory with the received compliance/non-compliance information.

6. The image reading apparatus according to claim 1, wherein when the selection instruction received in the selection receiving process is for selecting the second reading mode, the control unit is configured to:
   receive a first scan condition, which is not receivable in the input receiving process, from the external apparatus through the data communication unit; and
   perform the second reading mode, on the basis of the first scan condition and a second scan condition receivable in the input receiving process, in the scanning process.

7. The image reading apparatus according to claim 6, wherein the input operation unit comprises a display unit, and
   wherein the control unit makes the display unit display only the second scan condition in the input receiving process.

8. The image reading apparatus according to claim 7, wherein the control unit is configured to further perform:
   a scan-condition transmitting process of transmitting the second scan condition through the data communication unit when the selection instruction received in the selection receiving process is for selecting the second reading mode; and
   a scan-instruction receiving process of receiving a scan instruction including the first scan condition and the second scan condition from the external apparatus through the data communication unit, and
   wherein in the scanning executing process, the control unit performs the second reading mode on the basis of the scan instruction received in the read-instruction receiving process.

9. The image reading apparatus according to claim 8, wherein in the scan-instruction receiving process, the control unit receives the scan instruction including the first scan condition compatible with the second scan condition, from the external apparatus through the data communication unit.

10. The image reading apparatus according to claim 1, wherein after receiving the selection instruction in the selection receiving process, the control unit performs the communication receiving process.

11. The image reading apparatus according to claim 1,
wherein the input operation unit comprises a display unit, and
wherein after receiving the selection instruction for selecting the second reading mode in the selection receiving process, the control unit makes the display unit display option items of a scan condition receivable in the input receiving process.

12. An image reading system comprising a terminal device and an image reading apparatus configured to be communicably connected to the terminal device,
wherein the image reading apparatus comprises:
an input operation unit configured to receive user's input operation;
a reading device configured to perform a scanning operation of reading an image of a document, and
a control unit configured to perform:
a communication receiving process of receiving a scan condition for the scanning operation through the terminal device;
an input receiving process of receiving a scan condition for the scanning operation through the input operation unit;
a selection receiving process of receiving a selection instruction received by the input operation unit and representing whether to perform a first reading mode or a second reading mode, wherein the first reading mode is for making the reading device perform the scanning operation preferentially on a basis of the scan condition received in the communication receiving process, and wherein the second reading mode is for making the reading device perform the scanning operation preferentially on a basis of the scan condition received in the input receiving process; and
a scanning executing process of performing the reading mode selected by the selection instruction received in the selection receiving process.

13. A non-transitory computer-readable storage medium having an image reading program stored thereon and readable by a computer of an image reading apparatus, wherein the image reading apparatus comprises a data communication unit configured to perform data communication with an external apparatus, an input operation unit configured to receive user's input operation, and a reading device configured to perform a scanning operation of reading an image of a document, the image reading program, when executed by the computer, causes the computer to perform operations comprising:
a communication receiving process of receiving a scan condition for the scanning operation through the data communication unit;
an input receiving process of receiving a scan condition for the scanning operation through the input operation unit;
a selection receiving process of receiving a selection instruction received by the input operation unit and representing whether to perform a first reading mode or a second reading mode, wherein the first reading mode is for making the reading device perform the scanning operation preferentially on a basis of the scan condition received in the communication receiving process, and wherein the second reading mode is for making the reading device perform the scanning operation preferentially on a basis of the scan condition received in the input receiving process; and
a scanning executing process of performing the reading mode selected by the selection instruction received in the selection receiving process.

\* \* \* \* \*